United States Patent [19]

Prunier, Jr. et al.

[11] Patent Number: 5,878,849
[45] Date of Patent: Mar. 9, 1999

[54] CERAMIC METAL COMPOSITE BRAKE COMPONENTS AND MANUFACTURE THEREOF

[75] Inventors: Arthur R. Prunier, Jr.; Aleksander J. Pyzik, both of Midland, Mich.

[73] Assignee: The Dow Chemical Company, Midland, Mich.

[21] Appl. No.: 642,006

[22] Filed: May 2, 1996

[51] Int. Cl.$^6$ ....................................... F16D 69/00
[52] U.S. Cl. ............................ 188/251.4; 188/251 M; 188/251 R; 428/698; 428/704; 501/96.1; 501/97.4; 501/98.6
[58] Field of Search ................... 501/94, 96.1–96.5, 501/97.4, 98.6; 188/251 R, 251 A, 251 M; 428/325, 328, 331, 469, 472, 698, 704; 75/315

[56] References Cited

U.S. PATENT DOCUMENTS

| | | | |
|---|---|---|---|
| 3,864,154 | 2/1975 | Gazza et al. | 29/123 B |
| 4,067,743 | 1/1978 | Arabei et al. | 106/44 |
| 4,104,062 | 8/1978 | Weaver | 75/238 |
| 4,290,510 | 9/1981 | Warren . | |
| 4,605,440 | 8/1986 | Halverson et al. | 75/238 |
| 4,702,770 | 10/1987 | Pyzik et al. | 75/236 |
| 4,718,941 | 1/1988 | Halverson et al. | 75/236 |
| 4,834,938 | 5/1989 | Pyzik et al. | 419/6 |
| 5,028,494 | 7/1991 | Tsujimura et al. | 428/614 |
| 5,056,630 | 10/1991 | Fujii et al. . | |
| 5,224,572 | 7/1993 | Smolen, Jr. et al. . | |
| 5,325,941 | 7/1994 | Farinacci et al. . | |
| 5,394,929 | 3/1995 | Pyzik et al. | 164/97 |
| 5,501,306 | 3/1996 | Martino . | |
| 5,508,120 | 4/1996 | Pyzik et al. | 428/688 |
| 5,620,791 | 4/1997 | Dwivedi et al. | 428/323 |
| 5,629,101 | 5/1997 | Watremez . | |

OTHER PUBLICATIONS

Chemical Abstracts, 91–105979/15, "Prodn. of aluminum composite material for brake disc," JO 3047–945–A (1991).
Chemical Abstracts, 35455X/19, "Sintered titanium–based friction material," SU–473–758 (1984).
Chemical Abstracts, 87/287609/41, "Anti–abrasion braking material," J6 2200–042–A (1987).

Primary Examiner—Ponnathapura Achutamurthy

[57] ABSTRACT

A brake component wherein at least a portion of said brake component is a ceramic metal composite (CMC), the CMC having an interconnected ceramic phase and a noncontiguous metal phase dispersed within the interconnected ceramic phase. In particular, a CMC of dense boron carbide-aluminum composite having high specific heat and low density is described.

18 Claims, No Drawings

CERAMIC METAL COMPOSITE BRAKE COMPONENTS AND MANUFACTURE THEREOF

FIELD OF THE INVENTION

The present invention relates to brakes, and in particular to aircraft brakes, in which a ceramic matrix composite is at least a portion of a component in said brake.

BACKGROUND OF THE INVENTION

Herein, a brake is a device for arresting the motion of a mechanism by friction, wherein the mechanism can be any wheeled vehicle such as a car, plane or train. A brake component is any component whose primary function is to cause the frictional force or transfer of said force to arrest the motion of a mechanism. Examples of the brake component include a torque tube, piston housing, rotor and stator, described hereinbelow. A friction element is a brake component in which at least a portion contacts another friction element causing a frictional force to be developed. Illustrative examples of a frictional element include a brake pad and a rotor or stator wherein the rotor or stator directly contact another friction element.

Because of the demands of flight, the materials used to construct aircraft brakes have to meet more stringent criteria compared to other vehicles such as automobiles. In an aircraft, there are three basic modes of brake operation: normal service (landing), rejected take off (RTO) and taxi stops and snubs (taxiing). Upon landing a commercial aircraft such as a Boeing 737, the brake parts which provide friction to arrest motion (friction element) typically heat up to a temperature of 600° C. to 800° C. An RTO is the most severe brake operation, wherein the wear rate of the brake can be a thousand times or more greater than a landing and the temperature of the frictional material of the brake can easily exceed a temperature of 1000° C. or more. After an RTO, the brake is scrapped because the conditions are so severe. Taxi snubs and stops occur when the plane taxis to and from the runway. A snub is when the plane does not come to a full stop. Because aircraft require large amounts of braking energy in short periods of time (i.e., seconds), the friction element should have as large a specific heat as possible, wherein specific heat is the quantity of heat required for a one degree temperature change in a unit weight of material. Also, the friction element should have a low density to decrease aircraft weight and, subsequently, increase payload or decrease fuel consumption.

There are essentially two types of aircraft brakes in service today. The first type is a steel brake. The second type is a carbon/carbon composite brake. Each aircraft brake type has a brake assembly typically comprising a hydraulic piston assembly, torque tube, torque plate, integral wheel and alternating rotors and stators. The torque tube is typically made of steel or a titanium alloy. The wheel and hydraulic piston assembly are typically made of an aluminum alloy.

Typically, the aircraft brake assembly is configured as follows. The torque tube has grooves on the outer diameter running longitudinally the length of the tube to a flange. Typically, a backing plate (flat disk having an outer and inner diameter) is first slid onto the torque tube outer diameter until contacting the flange. The rotors and stators are then alternatingly slid onto the torque tube outer diameter. The rotors and stators are disks also having an inner and outer diameter. The rotors and the backing plate have no grooves on the inner diameter to engage the torque tube but have grooves or mounting means on the outer diameter to attach to the inner diameter of the wheel. The stators have grooves on the inner diameter which engage the torque tube. A pressure plate (a disk having inner diameter grooves engaging the torque tube) is then slid onto the torque tube. On top of the pressure plate is attached the hydraulic piston assembly which is connected to the torque tube by inner diameter grooves or by bolting to the torque tube. The above assembly is then slid over a landing strut axle and the torque tube is mounted to the landing strut at the hydraulic piston assembly end.

The wheel is attached to the backing plate and rotors of the above assembly. The wheel is typically attached by grooves on the inner diameter of the wheel which engage grooves on the outer diameter of the backing plate and rotors. The wheel is mounted to the axle by bearings and thrust nuts.

Functionally, the rotors spin with the wheel until application of the piston to the pressure plate, wherein the rotors contact the stators. Upon rotor-stator contact, torque is created by friction between the rotors and stators. The torque is transmitted to the landing strut via the torque tube, thus slowing the wheel and aircraft. The rotor-stator contact results in wear of the rotors and stators and also in significant heat generation. The stack of rotors and stators are commonly referred to as the heat sink because this is the part of the brake that absorbs energy, converts it to heat and then dissipates it to the atmosphere.

Steel brakes have pairs of rotors and stators, as described above, in which steel rotors (friction element) typically carry the brake pads and the stator is comprised of high-strength, high temperature steel. In a steel brake, the friction elements are the brake pads and stator. The brake pads which contact the stator are typically a metal matrix composite (MMC) wherein the matrix is copper or iron. The pads can be bonded to a rotor or stator by brazing, welding, riveting or direct diffusional bonding. The brake pads, typically, are in the form of segmented pads of some geometry such as trapezoids uniformly positioned around the face of the rotor or stator.

The second type of brake is a carbon/carbon composite brake. Carbon/carbon composite brakes have rotors, stators, backing plate and pressure plate made out of carbon/carbon composite. In this brake, the rotors and stators are the friction elements. Typically, a carbon/carbon composite is a composite of continuous carbon filaments embedded in a carbon matrix. The properties of the composite can vary widely depending on the processing and filament orientation.

As aircraft get ever bigger and faster, the amount of energy necessary to stop an aircraft during landing and RTO continues to increase. These two trends have necessitated the decrease of weight wherever possible and required the brakes to handle ever increasing energy inputs into the heat sink of the brake. Loads have increased because the size of the wheels and, hence, brakes are limited (i.e., by design and weight considerations). Because of weight, steel brakes, in general, are not used on larger commercial aircraft such as the Boeing 747.

Because carbon/carbon composites have a density of about a quarter of the density of steel, carbon/carbon composite brakes are generally used in high speed military aircraft and large commercial aircraft today. However, carbon/carbon composites have a specific heat (e.g., J/K-g) that is only about two times greater than the specific heat of steel. Thus, a carbon/carbon composite brake would have to be at least twice the size of a steel brake if limited to the same temperature increase as a steel brake during a landing or RTO. Carbon/carbon composite brakes avoid this unacceptable increase in size by operating at significantly higher temperatures than steel brakes. The higher temperature at which a carbon/carbon composite brake can operate is limited by the ability of surrounding structures (e.g., hydraulic piston assembly, wheel and tire) to withstand the temperature generated by the carbon/carbon heat sink and by the tendency of the carbon/carbon composite to oxidize at higher temperatures which causes unacceptable wear.

The coefficient of friction ($\mu$) of a friction material is desirably as great as possible. The coefficient is desirably as great as possible to minimize the load that is necessary to generate the frictional force (frictional force=$\mu$×normal load) needed to stop a plane. Carbon/carbon composites tend to adsorb water, which decreases the coefficient of friction. The lowered coefficient of friction lasts until the brake has heated up sufficiently during braking to evaporate the water.

During braking, the coefficient of friction of a carbon/carbon composite friction material may vary by a factor of 3 or more causing a corresponding torque variation which can lead to undesirable vibration. Carbon/carbon composite also displays a static coefficient of friction that is less than the dynamic coefficient. This frictional behavior may cause problems during stopping due to the increased load necessary as the wheel slows down.

Two of the largest costs associated with aircraft brakes are the initial cost and the maintenance cost to repair and replace the friction material due to wear. The cost of replacement includes the non-flying time of the aircraft. Thus, the initial cost and wear rate of a brake friction material are two critical components in the costs of operating a plane. Because carbon/carbon composite requires long periods of time to make a component (up to three weeks), the cost of this material is quite high. Also, carbon/carbon composite generally displays significantly higher wear due to mechanical abrasion during taxiing versus landing brake operation. This phenomena is probably due in part to the low hardness of the composite.

It would be desirable to provide a brake component which has a low density, high specific heat, and good high temperature properties such as high flexure strength. In particular, and relative to steel and C/C brakes, it is desirable to provide a friction element having the aforementioned characteristics plus stable coefficient of friction and low wear in all modes of operation (i.e., high hardness).

SUMMARY OF THE INVENTION

A first aspect of this invention is a brake component having at least about 5 percent by volume of said brake component being a ceramic metal composite (CMC), the CMC having:

an interconnected crystalline ceramic phase and a non-contiguous metal phase dispersed within the interconnected ceramic phase, a density of at most about 6 g/cc, a specific heat of at least about 0.8 J/g° C. and a strength of at least about 150 MPa at 900° C. wherein at least 45 volume percent of the ceramic phase has a melting or decomposition temperature of at least about 1400° C.

A second aspect of this invention is a brake having at least one friction element which has at least about 5 percent by volume of the element being comprised of a ceramic metal composite (CMC), the CMC contacting upon braking a second friction element and having:

an interconnected crystalline ceramic phase and a non-contiguous metal phase dispersed within the interconnected ceramic phase, a density of at most about 6 g/cc, a specific heat of at least about 0.8 J/g° C., an autogenous dynamic coefficient of friction of at least about 0.4, a hardness of at least about 1000 Kg/mm² and a flexure strength of at least about 150 MPa at 900° C.

wherein at least about 45 volume percent of the ceramic phase has a melting or decomposition temperature of at least about 1400° C.

The brake component of this invention provides a brake component having a low density, high specific heat and desired high temperature properties such as strength. In particular, when the brake component is a friction element the present invention provides improved hardness (i.e., less wear), high and stable coefficient of friction and the aforementioned characteristics.

DETAILED DESCRIPTION OF THE INVENTION

The brake component of this invention can be any brake component such as a pressure plate, piston housing and brake piston. Preferably the brake component is a friction element. More preferably the brake component is a friction element wherein the CMC contacts a second friction element upon braking.

The brake component can be entirely composed of the ceramic metal composite (CMC) or partially composed of the CMC wherein the CMC comprises at least about 5% by volume of the component. For example, said component may be a rotor or stator comprised entirely of the CMC. Alternatively, said component may be a rotor or stator which is partially comprised of said CMC. For example, the rotor or stator may have the grooves and material in close proximity to the grooves of the rotor or stator wherein said material has a higher toughness than the CMC, such as a metal or metal matrix composite. Preferably the CMC comprises at least 10%, more preferably 25%, and most preferably at least about 50% by volume of the component.

The metal phase of the CMC may be a metal selected from the Periodic Table Groups 2, 4–11, 13 and 14 and alloys thereof. Said groups conform to the new IUPAC notation as described on pages 1–10 of the *CRC Handbook of Chemistry and Physics* 71st Ed., 1990–91. Preferable metals include silicon, magnesium, aluminum, titanium, vanadium, chromium, iron, copper, nickel, cobalt, tantalum, tungsten, molybdenum, zirconium, niobium or mixtures and alloys thereof. More preferred metals are aluminum, silicon, titanium and magnesium or mixtures and alloys thereof. Aluminum and alloys thereof are most preferred. Suitable aluminum alloys include aluminum containing one or more of Cu, Mg, Si, Mn, Cr and Zn. Al—Cu, Al—Mg, Al—Si, Al—Mn-Mg and Al—Cu—Mg—Cr—Zn aluminum alloys are more preferred. Examples of such alloys are 6061 alloy, 7075 alloy and 1350 alloy, all available from the Aluminum Company of America, Pittsburgh, Pa.

The ceramic phase of the CMC is crystalline, wherein at least about 45 volume percent of said phase has a melting or decomposition temperature of at least about 1400° C. Preferably at least about 60%, more preferably at least about 80% and most preferably at least about 90% by volume of the ceramic phase has a melting or decomposition temperature of at least about 1400° C. Preferably the decomposition temperature or melt temperature is at least about 1500° C., more preferably at least about 1600° C. and most preferably at least about 1700° C. The ceramic is desirably a boride, oxide, carbide, nitride, silicide or mixtures and combinations thereof. Combinations include, for example, borocarbides, oxynitrides, oxycarbides and carbonitrides. More preferred ceramics are SiC, $B_4C$, $Si_3N_4$, $Al_2O_3$, $TiB_2$, $SiB_6$, $SiB_4$, AlN, ZrC, ZrB, a reaction product of at least two of said ceramics, or a reaction product of at least one of said ceramics and the metal. The most preferred ceramic is boron carbide.

Examples of CMC metal-ceramic combinations include $B_4C/Al$, SiC/Al, AlN/Al, $TiB_2/Al$, $Al_2O_3/Al$, $SiB_x/Al$, $Si_3N_4/Al$, SiC/Mg, SiC/Ti, SiC/Mg-Al, $SiB_x/Ti$, $B_4C/Ni$, $B_4C/Ti$, $B_4C/Cu$, $Al_2O_3/Mg$, $Al_2O_3/Ti$, TiN/Al, TiC/Al, $ZrB_2/Al$, ZrC/Al, $AlB_{12}/Al$, $AlB_2/Al$, $AlB_{24}C_4/Al$, $AlB_{12}/Ti$, $AlB_{24}C_4/Ti$, TiN/Ti, TiC/Ti, $ZrO_2/Ti$, $TiB_2/B_4C/Al$, SiC/$TiB_2$/Al, TiC/Mo/Co, ZrC/ZrC/$ZrB_2$/Zr, $TiB_2$/Ni, $TiB_2$/Cu, TiC/Mo/Ni, SiC/Mo, $TiB_2$/TiC/Al, $TiB_2$/TiC/Ti, WC/Co and WC/Co/Ni. The subscript "x" represents varying silicon boride phases that can be formed within the part. More preferred combinations of a metal and ceramic include: $B_4C/Al$, SiC/Al, $SiB_6/Al$, $TiB_2/Al$ and SiC/Mg. Most preferably, the CMC is comprised of a chemically reactive system such as aluminum-boron carbide or aluminum alloy-boron carbide. In a chemically reactive system, the metal component can react with the ceramic during formation of the CMC resulting in a new ceramic phase being formed. Said new phase can modify properties such as hardness and high temperature strength of the composite. A most preferred chemically reactive system is $B_4C/Al$, wherein the metal phase is aluminum or alloy thereof, and the interconnected ceramic phase is comprised of at least two ceramics selected from the group consisting of $B_4C$, $AlB_2$, $Al_4BC$, $Al_3B_{48}C_2$, $AlB_{12}$ and $AlB_{24}C_4$.

Herein, metal phase is considered to be noncontiguous when the individual regions of metal are neither touching nor connected throughout the CMC. The metal phase, consequently, is preferably at most about 15% by weight of the CMC. The amount of metal is preferably within a range of from about 2 to about 8 wt. percent, based on total composite weight. Alternatively, the ceramic phase is preferably present in amounts between about 85% to 98% by volume of the CMC. The dispersed noncontiguous metal phase is preferably comprised of metal regions in which the average equivalent diameter of the regions are at most about 30, more preferably at most about 10, and most preferably at most about 5 microns and preferably at least about 0.25, more preferably at least about 0.5, and most preferably at least about 1 micron. Preferably the largest metal region is at most 100, more preferably at most 75, and most preferably at most 50 microns in diameter. In addition, it is also preferred that the metal regions are predominately equiaxed and predominately situated at ceramic-ceramic grain triple points as opposed to elongated along ceramic grain boundaries as determined by optical quantitative stereology from a polished sample described by K. J. Kurzydtowski and B. Ralph, *The Quantitative Description of the Microstructure of Materials*, CRC Press, Boca Raton, 1995.

Because air or voids have low specific heat and low thermal conductivity, the CMC preferably has a density of at least about 90 percent, more preferably at least about 95 percent and most preferably at least about 98 percent of theoretical.

Since reduced weight is a critical factor in aircraft brakes, the CMC has a density of at most about 6 g/cc, preferably at most about 4 g/cc, and more preferably at most about 3 g/cc. The CMC can have a density of about 1.5 g/cc and still be useful as a brake component. A density lower than 1.5 g/cc may not be useful as a friction element, but said element having said density may be useful as a component which shields other components from excessive heat.

When the brake component is a friction element, the dynamic coefficient of friction of the CMC against itself (autogenous) is desirably at least about 0.4 determined at a 1 pound load by a pin on disk method described by ASTM G-99 Standard and M. A. Moore, in *Wear of Materials*, pp. 673–687, Am. Soc. Eng., 1987. The CMC coefficient of friction is preferably at least about 0.8, more preferably at least about 1.2, and most preferably at least about 1.4 to preferably at most about 5. In addition, the coefficient of friction of the CMC at a temperature of about 1000° C. desirably does not deviate more than about plus or minus 50 percent, preferably not more than +/- about 40 percent, more preferably not more than +/- about 20 percent, and most preferably not more than +/- about 10 percent from the room temperature coefficient of friction at a given load.

When the brake component is a friction element, the wear rate of the CMC as given by the scar diameter of the above described pin on disk method is desirably as small as possible. The sum diameter is preferably less than about 2 mm, more preferably less than about 1.5 mm, and most preferably less than about 1 mm. To minimize wear, the CMC also desirably has a hardness of at least about 1000 $Kg/mm^2$. Preferably the hardness is at least about 1200, more preferably at least about 1400, and most preferably at least about 1600 $Kg/mm^2$ to preferably at most about 5000 $Kg/mm^2$ as determined by Vickers hardness at a load of 30 pounds.

The CMC preferably has a toughness of at least about 5 $MPam^{1/2}$ so as to avoid catastrophic failure of the brake. More preferably the CMC toughness is at least 5.5, even more preferably at least 6 and most preferably at least about 6.5 $MPam^{1/2}$ to preferably at most about 25 $MPam^{1/2}$ as determined by a Chevron Notch method described in *Chevron-Notched Specimens: Testing and Stress Analysis*, STP 855, pp. 177–192, Ed. J. H. Underwood et al., Amer. Soc. for Testing and Matl., PA, 1984.

To dissipate the heat generated during braking, both the CMC and the brake component containing the CMC preferably have a thermal conductivity of at least about 10 W/m-K as determined by a laser flash method described in more detail by "Flash Method of Determining Thermal Diffusivity, Heat Capacity, and Thermal Conductivity," in *Journal of Applied Physics*, W. J. Parker et al., 32, [9], pp. 1679–1684. More preferably said thermal conductivity is at least about 15, even more preferably at least about 20, and most preferably at least about 25 W/m-K. However, the thermal conductivity should not be so great that other brake components such as an aluminum hydraulic piston housing are adversely affected. Thus, the CMC and brake component desirably have a thermal conductivity less than about 150 W/m-K.

To absorb the frictionally generated heat during braking, the CMC has a specific heat of at least about 0.8 J/g° C. at room temperature as determined by differential scanning calorimetry. Preferably the specific heat is at least about 0.9 and more preferably at least about 1 J/g° C. to preferably at most the maximum theoretically possible for a selected material. The specific heat also desirably increases as the temperature increases. For example, the specific heat at 1000° C. is desirably at least double the specific heat at room temperature.

To minimize failure of a brake, the high temperature flexure strength of the CMC is at least about 150 MPa at a temperature of about 900° C. as determined by ASTM C1161. Preferably the strength at 900° C. is at least about 200 MPa, more preferably at least about 300 MPa, and most preferably at least about 400 MPa to preferably at most about 1500 MPa.

The brake component can be made by any convenient or known method which results in said component containing the CMC, described herein. For example, the brake component may be a metal rotor which is fabricated by any convenient metal forming method such as casting, followed by machining, wherein brake pads comprised of the CMC, described herein, are subsequently bonded to said rotor. The CMC can be bonded to said rotor by any convenient method such as brazing, welding, riveting and direct diffusional bonding. Alternatively, the brake component can be comprised entirely of the CMC.

The CMC portion of the brake component can be made by any convenient or known powdered metal or ceramic processing technique wherein a shaped body is formed followed by a consolidation technique(s) and, if desired, finishing the article to final shape. The ceramic and metal can be any metal or ceramic previously described. Two typical consolidation routes which can be used to form the CMC of this invention are (1) infiltrating a porous ceramic particulate body (greenware) with metal and (2) densifying a porous particulate body (greenware) containing metal and ceramic particulates. The infiltrated or densified body can then be finished (i.e., machined) by techniques such as diamond grinding, laser machining and electro discharge machining. Said body can also be heat treated to alter the microstructure of the consolidated composite. Preferably the composite is made by infiltration.

The ceramic or metal powder typically has an average particle size by weight of at most about 50 micrometers, preferably at most about 15 micrometers, more preferably at most 10 microns, and most preferably at most 5 microns. The particles may be in the shape of platelets, rods or equiaxed grains. The particles of the ceramic powder desirably have a particle diameter within a range of 0.1 to 10 micrometers.

Suitable shaping methods to form greenware (i.e., a porous body made up of particulates) for infiltrating or densifying include slip or pressure casting, pressing and plastic forming methods (e.g., jiggering and extrusion). The shaping methods may include steps such as mixing of components such as ceramic powder, metal powder, dispersants, binders, and solvent and removing, if necessary, solvent and organic additives such as dispersants and binders after shaping of the greenware. Each of the above methods and steps are described in more detail in *Introduction to the Principles of Ceramic Processing*, J. Reed, J. Wiley and Sons, N.Y., 1988.

The metal-ceramic particulate greenware can be densified into a substantially dense composite by techniques such as vacuum sintering, atmospheric pressure (pressureless) sintering, pressure assisted sintering such as hot pressing, hot isostatic pressing and rapid omni directional compaction and combinations thereof, each pressure assisted technique is further described in *Annu. Rev. Mater. Sci.*, 1989, [19], C. A. Kelto, E. E. Timm and A. J. Pyzik, pp. 527–550. Substantially dense composite, herein, is a body having a density greater than about 90 percent of theoretical.

The metal-ceramic particulate greenware is densified under conditions of time, atmosphere, temperature and pressure sufficient to densify the greenware to a composite having a desired density. The temperature is typically greater than about 75% of the melt temperature in degrees C. of the metal but less than a temperature where substantial volatilization of the metal occurs. For example, the densification temperature for an aluminum-boron carbide system is preferably between 500° C. to 1350° C. The time is desirably as short as possible. Preferably the time is at most about 24 hours, more preferably at most about 2 hours, and most preferably at most about 1 hour. The pressure is desirably ambient or atmospheric pressure. The atmosphere is desirably one that does not adversely affect the densification or chemistry of the CMC.

Preferably, the CMC is produced by infiltrating a porous ceramic body with a metal, thus forming a composite. Ceramic-metal combinations which may be suitable for infiltration are described herein. The infiltrated body may be further consolidated by techniques described hereinabove. More preferably the ceramic of the metal infiltrated ceramic also reacts with the metal, thus forming a new ceramic phase in the dense composite (i.e., chemically reactive system). A preferred embodiment of a chemically reactive system is the infiltration of boron carbide with aluminum or alloy thereof, as described below, and U.S. Pat. No. 5,508,120.

Infiltration involves forming a porous ceramic preform (i.e., greenware) prepared from ceramic powder by a procedure described hereinabove, such as slip casting (i.e., a dispersion of the ceramic powder in a liquid) or pressing (i.e., applying pressure to powder in the absence of heat) and then infiltrating a liquid metal into the pores of said preform. Infiltration is the process in which a liquid metal fills the pores of preform in contact with the metal. The process preferably forms a uniformly dispersed and essentially fully dense ceramic-metal composite. Infiltration of the porous preform can be performed by any convenient method for infiltrating a metal into a preform body, such as vacuum infiltration, pressure infiltration and gravity/heat infiltration. Examples of infiltration are described by U.S. Pat. Nos. 4,702,770 and 4,834,938, each incorporated herein by reference.

The temperature of infiltration is dependent on the metal to be infiltrated. Infiltration is preferably performed at a temperature where the metal is molten but below a temperature at which the metal rapidly volatilizes. For example, when infiltrating aluminum or an alloy thereof into a porous ceramic preform, the temperature is preferably at most about 1200° C., and more preferably at most about 1100° C. and preferably at least about 750° C., and more preferably at least about 900° C. The infiltration time can be any time sufficient to infiltrate the ceramic preform resulting in a desired CMC. The atmosphere can be any atmosphere which does not adversely affect the infiltration of metal or development of said CMC.

The preform may contain, in the case of chemically reactive systems, a ceramic filler material in an amount from about 0.1 to about 50 weight percent, based upon total preform weight. Filler is material which has no, or a significantly lower, reactivity with the infiltrating metal than a chemically reactive ceramic, such as boron carbide in the boron carbide-aluminum system. For example, when a boron carbide preform contains filler, the preform preferably contains from 70 to 95 wt. percent $B_4C$ and from 5 to 30 wt. percent ceramic filler. The percentages are based upon total preform weight. For example, in the boron carbide-aluminum system, the ceramic filler material can be titanium diboride, titanium carbide, silicon boride, aluminum oxide and silicon carbide.

When making, by infiltration, the most preferred CMC (boron carbide-aluminum system) of the brake component, the porous boron carbide preform is desirably baked at a temperature of at least 1400° C. prior to infiltration. Baking should continue for at least 15 minutes, desirably at least 30 minutes, and preferably two hours or more.

The baked porous boron carbide preform is then infiltrated with aluminum or alloy thereof by any convenient method described hereinabove.

Ceramic-metal composites resulting from infiltration of baked $B_4C$ preforms, in which the metal has to infiltrate distances greater than 0.8 cm, have more uniform microstructures than infiltrated unbaked $B_4C$ preforms having the same metal infiltration distance. Although they have a more uniform microstructure, these ceramic-metal composites, because of residual unreacted metal, typically do not have the high temperature strength desired for this invention. In order to overcome this deficiency, the resulting composites (CMCs) typically are subjected to an additional (post-infiltration) heat treatment. The infiltrated composite is heat treated at a temperature within a range of from about 660° C. to about 1250° C., preferably from about 660° C. to about 1100° C., and more preferably from about 800° C. to about 950° C., in the presence of air or some other oxygen-containing atmosphere, for a time sufficient to allow slow reactions between residual unreacted metal and $B_4C$ or B—Al—C reaction products or both. The reactions promote reduction of free (unreacted) metal and development of a uniform microstructure.

Post infiltration heat treating the boron carbide-aluminum composite outside the range of about 660° C. to about 1250° C. typically yields unsatisfactory results. Temperatures of less than 660° C. typically do not result in the residual metal being less than about 15 wt. percent, based on total composite weight or less. The residual metal is not reduced below about 15 percent because the reaction kinetics are very slow. Temperatures in excess of 1250° C. generally lead to formation of undesirable amounts of aluminum carbide ($Al_4C_3$) which is hydrolytically unstable (i.e., reacts with water). The aluminum carbide may adversely affect the coefficient of friction of the composite.

The post-infiltration heat treatment has a duration that typically ranges from 1 to 100 hours, desirably from 10 to 75 hours, and preferably from 25 to 75 hours. A duration in excess of 100 hours increases production costs, but yields no substantial additional improvements in microstructure over those occurring at 100 hours.

The boron carbide-aluminum composite described, hereinabove, typically has a bulk microstructure containing isolated $B_4C$ grains or clusters of $B_4C$ grains surrounded by a multiphase ceramic matrix, an $Al_2O_3$ surface layer and dispersed noncontiguous unreacted aluminum. The ceramic phase comprises at least one of, preferably at least two of, aluminum borides and aluminum borocarbides. The composite typically comprises from 40 to 75 wt. percent $B_4C$ grains, from 20 to 50 wt. percent aluminum borides and aluminum borocarbides and from 2 to 8 wt. percent aluminum or aluminum alloy, all percentages being based upon composite weight and totaling 100 percent. The aluminum borides and aluminum borocarbides are selected from the group consisting of $AlB_{24}C_4$, $Al_3B_{48}C_2$, $Al_4BC$, $AlB_2$ and $AlB_{12}$. The aluminum borides and borocarbides are desirably $AlB_{24}C_4$ and $AlB_2$, preferably with a ratio of $AlB_{24}C_4/AlB_2$ that is within a range of from 10:1 to 1:5. The latter range is more preferably from 10:1 to 2:1.

When a ceramic filler material is present in the boron carbide-aluminum CMC, the filler typically is present in the CMC either as isolated grains or as part of the clusters of $B_4C$ grains. The amount of ceramic filler material typically is between about 1 to 25 volume percent, based upon total composite volume.

Described below are methods to prepare a CMC useful in making the brake components and friction elements of this invention.

METHOD 1

$B_4C$ (ESK specification 1500, manufactured by Elektroschemeltzwerk Kempten of Munich, Germany) having an average particulate size of 3 micrometers in diameter) is dispersed in distilled water to form a suspension. The suspension is ultrasonically agitated, then adjusted to a pH of 7 by addition of $NH_4OH$ and aged for 180 minutes before being cast on a plaster of Paris mold to form a porous ceramic body (greenware) having a ceramic content of 69 volume percent. The $B_4C$ greenware is dried for 24 hours at 105° C. The greenware sizes were 120×120×10 millimeters (mm) (thin tiles) and 120×120×16 mm (thick tiles).

Pieces of the greenware are used as is and after being baked at 1300° C. for 120 minutes, baked at 1400° C. for 120 minutes, baked at 1800° C. for 60 minutes or baked at 2200° C. for 60 minutes. All baking and sintering take place in a graphite element furnace. The baked greenware pieces are then infiltrated with molten Al (a specification 1145 alloy, manufactured by Aluminum Company of America that is a commercial grade of Al, comprising less than 0.55 percent alloying elements such as Si, Fe, Cu and Mn) under a vacuum of 100 millitorr (13.3 Pa) at 1180° C. for 120 minutes to provide composite (boron carbide-aluminum composite) pieces.

Composite pieces prepared from the thin tiles are all quite uniform from top to bottom even though some differences are noticeable. As such, the baking temperature does not have a significant impact upon microstructure.

Composite pieces prepared from the thick tiles have nonuniform microstructures that varied from bottom (closest to infiltrating metal) to top (farthest from the infiltrating metal) in amount of B—Al—C phases and in phase morphology. The bottoms have a microstructure of equiaxed $AlB_2$ and $Al_4BC$ with less than 2 volume percent free Al. The tops have a microstructure of $AlB_2$ and $Al_4BC$ grains shaped like 50–100 micrometers long cigars in an Al matrix. The amount of free Al ranged between 5–15 vol. percent.

As shown in Table I, a post-infiltration heat treatment at 690° C. in air for 50 hours provided an increase in hardness for all composite pieces. The data in Table I also show that greenware baked at temperatures below 1800° C. yields harder composites than composites made from greenware baked at temperatures above 1800° C. The greenware that is baked at 1400° C. and 1700° C. results in composites with uniform microstructures and high hardness values. The data in Table I further show that green $B_4C$ and $B_4C$ baked below 1400° C. produce uniform and hard parts when limited to small sizes (<10 mm vertical metal flow). As vertical metal flow distances exceed 10 mm in green (unbaked) $B_4C$ and $B_4C$ baked below 1400° C., hardness remains relatively high, but resulting parts exhibit nonuniform microstructures. In summary, Table I shows that the CMC of the present invention can be made by various routes. CMCs possessing the required hardness for a friction element in which the CMC contacts a second friction element upon braking (i.e., at least about 1000 Kg/mm²) can also be made by various routes and desirably the route includes a post infiltration heat treatment (last column of Table I).

TABLE I

| $B_4C$ Bake Temp (°C.) | Bake Time (minutes) | Part Uniformity (Bottom to Top) | | Vickers Hardness* (kg/mm²) | |
|---|---|---|---|---|---|
| | | 10 mm Thick Greenware | 16 min Thick Greenware | Before Heat Treatment | After Heat Treatment |
| 20 | 0 | Uniform | Nonuniform | 1300 | 1550 |
| 1300 | 120 | Uniform | Nonuniform | 700 | 1420 |
| 1400 | 120 | Uniform | Uniform | 450 | 1700 |
| 1800 | 120 | Uniform | Uniform | 480 | 1750 |
| 2200 | 60 | Uniform | Uniform | 450 | 1030 |

*14.4 Kg load

METHOD 2

Pieces of greenware are prepared and infiltrated with or without baking, as in Method 1. Chemical analysis of the infiltrated greenware pieces is performed using an MBX-CAMECA microprobe, available from Cameca Co., France. Crystalline phases are identified by X-ray diffraction (XRD) with a Phillips diffractometer using CuKa radiation and a scan rate of 2° per minute. The amount of Al present in the infiltrated greenware (i.e., before heat treatment) is estimated based upon differential scanning calorimetry (DSC). All of the greenware pieces are then heated from the melting point of Al (660° C.) to 900° C. over a period of one hour before 3×4×45 mm specimens from one-half of the pieces are subjected to Flexure Strength testing using a four-point bend test (ASTM C1161) at 900° C. The samples are maintained in air at that temperature for 15 minutes before they are broken. Upper and lower span dimensions are 20 and 40 mm, respectively, and the specimens are broken using a crosshead speed of 0.5 mm/min. Specimens from the other pieces are subjected to an additional heat treatment for 25 hours in air at 690° C. before they are heated again to 900° C. over a period of one hour and broken in Flexure Strength testing (Last column of Table II).

TABLE II

Phase Chemistry and Properties

| Sample Identification | Initial Composition (wt % $B_4C$/wt % Al) | Greenware Bake Temperature (°C.) | Residual Al Content Before Heat Treatment (wt %) | Flexure Strength Before Heat Treatment @ 900° C. (MPa) | Flexure Strength After Heat Treatment @ 900° C. (MPa) |
|---|---|---|---|---|---|
| A | 85/15 | 2200 | 10 | 188 | — |
| B | 80/20 | 2200 | 15 | 266 | 290 |
| C | 80/20 | 1400 | 15 | 180 | 430 |
| D* | 70/30 | 1400 | 25 | 170 | 450 |
| E* | 64/36 | 1400 | 30 | 52 | 380 |
| F | 80/20 | 20 | 5 | 400 | — |
| G | 75/25 | 20 | 10 | 400 | 410 |
| H | 70/30 | 1300 | 15 | 383 | 390 |

—means not measured; *not an example of this invention.

The data in Table II show that the heat treatment history of greenware prior to infiltration has a marked influence upon Flexure Strength of the resultant $B_4C$/Al composites. The data show that the CMC according to this invention is possible without a heat treatment (e.g., Examples A, B, C, F, G and H) but it is preferable to heat treat the composite to increase the high temperature strength. The data in Table II also show that the CMC described herein can be achieved by heat treating a sample which does not have the microstructure before heat treatment (e.g., Examples D and E). The data also show, particularly for Samples A and G. that metal content alone does not determine strength at elevated temperatures before heat treatment. The strength at high temperature is also affected by ceramic phases formed during infiltration. Samples F, G and H have the highest flexure strength values prior to a post-infiltration heat treatment. This may be due to fast chemical reaction kinetics in conjunction with a sufficient amount of $B_4C$. The data further show that the post-infiltration heat treatment generally leads to an increase in flexure strength.

Similar results are expected with other compositions and process conditions, all of which are disclosed herein.

Method 3

Composite ($B_4C$—Al) samples having respective initial $B_4C$ and Al contents of 75 volume percent and 25 volume percent are prepared by baking $B_4C$ greenware at 1300° C. for 30 minutes and infiltrating the greenware with the same Al alloy as in Example 1 for 60 minutes at 1150° C. The greenware, prior to infiltration, is in the form of tiles measuring 120×120×10 mm. After infiltration, the tiles are ground into 4×3×45 mm bars. The bars are divided into 4 groups. The first group (Group A) of samples are used as infiltrated, the second (Group B) is heat treated at 800° C. in argon for 100 hours, the third (Group C) is heat treated in air at 800° C. for 2 hours, the fourth (Group D) is heat treated in air at 800° C. for 100 hours. The samples are all subjected to flexure strength testing as described in Example 2, save for changing the temperatures (Table III) at which samples are broken.

TABLE III

| Group/ Temperature | Flexure Strength (MPa) at Various Temperatures (°C.) | | | | | | | |
|---|---|---|---|---|---|---|---|---|
| | 20 | 200 | 400 | 600 | 700 | 800 | 900 | 1100 |
| A | 520 | 510 | 460 | 320 | 300 | 240 | 200 | — |
| B | — | — | — | 330 | 310 | 300 | 250 | — |
| C | — | — | — | 330 | 350 | 380 | 400 | 290 |
| D | — | 510 | 460 | 430 | 440 | — | 440 | 340 |

—means not measured

The data in Table III show that strength increases as a result of heat treatment (B, C and D compared to A). The data also show that heat treatment in air results in higher strength at high temperatures than heat treatment in inert atmospheres or no heat treatment (C and D compared to A and B).

METHOD 4

A boron carbide-aluminum composite is made by the same method as the method used to make the heat treated sample H in Table II. This sample is tested against itself by an unlubricated pin on disk method at varying loads. The pin on disk method used is described herein. The sample has a coefficient of friction of 1.8 at a load of 1 pound and a coefficient of friction of 1.7 at a load of 2 pounds. The wear scar diameter is 0.8 mm at a 1 pound load, 1.0 mm at a 2 pound load and 1.2 mm at a 3 pound load.

What is claimed is:

1. A brake component having at least about 5 percent by volume of said brake component being a ceramic metal composite (CMC), the CMC having:

an interconnected crystalline ceramic phase and a non-contiguous metal phase dispersed within the interconnected ceramic phase, a density of at most about 6 g/cc, a specific heat of at least about 0.8 J/g°C., and a flexure strength of at least about 150 MPa at 900° C., wherein at least 45% by volume of the ceramic phase has a melting or decomposition temperature of at least about 1400° C.

2. The brake component of claim 1, wherein the component is a brake friction element in which the CMC of said element contacts a second friction element upon braking and the CMC has a hardness of at least 1000 Kg/mm$^2$ and an autogenous dynamic coefficient of friction of at least about 0.4.

3. The brake component of claim 1, wherein the ceramic phase is selected from the group consisting of: SiC; B$_4$C; Si$_3$N$_4$; Al$_2$O$_3$; TiB$_2$; SiB$_6$; SiB$_4$; AlN; ZrC; ZrB; a reaction product of at least two of said ceramics and a reaction product of at least one of said ceramics and the metal.

4. The brake component of claim 1, wherein the metal phase is aluminum or an alloy thereof and the ceramic phase is comprised of at least two ceramics selected from the group consisting of:

(a) B$_4$C, (b) AlB$_2$, (c) Al$_4$BC, (d) Al$_3$B$_{48}$C$_2$, (e) AlB$_{12}$ and (f) AlB$_{24}$C$_4$.

5. The brake component of claim 1, wherein the metal phase is at least one metal selected from the group consisting of: aluminum; zirconium; titanium; copper; silicon; magnesium and alloys thereof.

6. The brake component of claim 1, wherein the ceramic phase comprises between about 85 to 98 volume percent of the CMC.

7. The brake component of claim 1, wherein the metal phase is comprised of metal regions having an average equivalent diameter between about 0.25 to about 30 micrometers as determined by optical quantitative stereology.

8. The brake component of claim 1, wherein the CMC has a Chevron Notch toughness of at least about 5 MPam$^{1/2}$.

9. The brake component of claim 1, wherein the specific heat is at least about 1.0 J/g°C.

10. The brake component of claim 1, wherein the CMC has a thermal conductivity greater than about 15 W/m-K.

11. The brake component of claim 1, wherein the density of the CMC is at most about 3 g/cc.

12. The brake component of claim 1, wherein the CMC has a theoretical density which is at least about 95 percent of theoretical.

13. The brake component of claim 2, wherein the CMC has a coefficient of friction of at least about 1.0.

14. The brake component of claim 2, wherein the CMC has a pin on disk scar diameter of at most about 1.5 mm under a 1 pound load.

15. The brake component of claim 2, wherein the strength of the CMC is at least about 200 MPa at 900° C.

16. The brake component of claim 12, wherein the specific heat is at least 1 J/g°C. at room temperature, the theoretical density is at least about 98 percent of theoretical and the density is at most about 3.0 g/cc.

17. A brake having at least one friction element which has at least about 5 percent by volume of the element being comprised of a ceramic metal composite (CMC), the CMC contacting upon braking a second friction element and having:

an interconnected crystalline ceramic phase and a non-contiguous metal phase dispersed within the interconnected ceramic phase, a density of at most about 6 g/cc, a specific heat of at least about 0.8 J/g°C., an autogenous dynamic coefficient of friction of at least about 0.4, a hardness of at least about 1000 Kg/mm$^2$, and a flexure strength of at least about 150 MPa at 900° C. wherein at least 45% by volume of the ceramic phase has a melting or decomposition temperature of at least about 1400° C.

18. The brake of claim 17, wherein the brake is a train or plane brake.

* * * * *